(12) United States Patent
Park

(10) Patent No.: US 6,813,172 B2
(45) Date of Patent: Nov. 2, 2004

(54) POWER SUPPLY CIRCUIT FOR VIDEO DISPLAY DEVICE

(75) Inventor: Cheol-jin Park, Suwon (KR)

(73) Assignee: Samsung Electronics Co., Ltd., Gyunggi-do (KR)

( * ) Notice: Subject to any disclaimer, the term of this patent is extended or adjusted under 35 U.S.C. 154(b) by 34 days.

(21) Appl. No.: 10/409,589

(22) Filed: Apr. 9, 2003

(65) Prior Publication Data

US 2003/0235061 A1 Dec. 25, 2003

(30) Foreign Application Priority Data

Jun. 21, 2002 (KR) .......................................... 2002-34977

(51) Int. Cl.[7] .............................................. H02H 7/122
(52) U.S. Cl. .................... 363/56.12; 361/91.7; 345/211
(58) Field of Search ........................... 363/56.01, 56.09, 363/56.11, 56.12; 361/91.7, 111; 345/211, 212

(56) References Cited

U.S. PATENT DOCUMENTS 4,550,359 A * 10/1985 West ........................ 363/56.12
6,301,132 B1 * 10/2001 Vandelac .................. 363/56.01
6,606,259 B2 * 8/2003 Cohen ...................... 363/56.01

* cited by examiner

Primary Examiner—Jessica Han
(74) Attorney, Agent, or Firm—Sughrue Mion, PLLC

(57) ABSTRACT

A power supply circuit for a video display device including a power transformer for inducing a voltage with respect to an input voltage by using an interaction occurring between a primary coil and a secondary coil; a switching circuit unit for controlling the voltage to be induced at the secondary coil of the power transformer by switching on/off a current flowing along the primary coil of the power transformer; first and second TVS diodes serially connected to each other; first and second resistors parallel connected to the respective first and second TVS diodes; a capacitor parallel connected to both ends of the first and second TVS diodes connected to each other and being charged with the transient voltage in the reverse direction that is supplied through the primary coil of the power transformer; and a diode for forming a passage of current in one direction when the capacitor is charged.

7 Claims, 4 Drawing Sheets

POWER SUPPLY CIRCUIT FOR VIDEO DISPLAY DEVICE

BACKGROUND OF THE INVENTION

1. Field of the Invention

The present invention relates to a power supply circuit for a video display device, and more particularly, to a power supply circuit capable of improving transient state characteristics of a TVS (Transient Voltage Suppressor) diode that is used in an inner snubber circuit unit. The present application is based on Korean Patent Application No. 2002-34977 filed on Jun. 21, 2002, which is incorporated herein by reference.

2. Description of the Prior Art

A video display device such as a television requires direct current (DC) power for driving inner components. For example, during a scanning with an up-and-down and left-to-right sweep of an electron beam projected from an electron beam gun, the DC power is used to deflect the electron beam projected from the electron beam gun. In order to obtain the DC power, a power supply device is used to smooth and rectify an alternating current (AC) received from an external source.

FIG. 1 is a circuit diagram showing a power supply device for a conventional video display device.

As shown in the circuit diagram, a power supply circuit comprises a rectifier circuit unit 10, a switching circuit unit 20, a power transformer 30, an output circuit unit 40, and a snubber circuit unit 50.

The rectifier circuit unit 10 rectifies an AC power externally inputted by using diodes D1~4 for a rectification and a capacitor C1. The voltage rectified by the rectifier circuit unit 10 is supplied to a primary coil of the power transformer 30. The power transformer 30 induces a voltage at a secondary coil by using an interaction occurring between the primary and secondary coils. At this time, the switching circuit unit 20 switches on/off the flow of the current along the primary coil of the power transformer 30, thereby controlling the voltage to be induced at the secondary coil of the power transformer 30. The output circuit unit 40 rectifies and smoothes the voltage induced at the secondary coil of the power transformer 30 to obtain a DC power.

The snubber circuit unit 50 consists of a residual current device (RCD) snubber circuit and first and second TVS (Transient Voltage Suppressor) diodes TVS1 and TVS2 serially connected to each other. When the switching circuit unit 20 switches on/off the current of the primary coil of the power transformer 30, the snubber circuit unit 50 absorbs and removes a transient voltage in a reverse direction that is generated at the power transformer 30. The first and second TVS diodes TVS1 and TVS2 are elements for protecting a weak circuit in an electrically transient state that is caused due to the electrostatic discharge, the inductive load switching or the induced lightning.

However, the first and second TVS diodes TVS1 and TVS2 used in the snubber circuit unit 50 have different levels of inner capacitance because a semiconductor fabrication does not allow a complete uniformity of the products. Due to the different levels of capacitance, the voltages supplied to the respective first and second TVS diodes TVS1 and TVS2 are unequal.

FIG. 2 shows waveforms of the voltages supplied to the first and second TVS diodes TVS1 and TVS2.

Referring to FIG. 2, a waveform A represents total voltages that are supplied to both ends of the first and second TVS diodes TVS1 and TVS2 serially connected to each other, with the maximum value of 259V. A waveform Ref1 represents a voltage that is supplied to both ends of the second TVS diode TVS2, with the maximum value of 213V. A waveform Ref2 represents a voltage that is supplied to the first TVS diode TVS1, with the maximum value of 48.5.

As shown in FIG. 2, there is a difference between levels of the voltages that are supplied to the first TVS diode TVS1 and the second TVS diode TVS2. This difference is caused by the different inner capacitances as described above.

When the voltages are not equally supplied to the first and second TVS diodes TVS1 and TVS2 serially connected to each other, one of the first and second TVS diodes TVS1 and TVS2 may be supplied with a transient voltage exceeding a rated voltage. Such a transient voltage exceeding the rated voltage causes a burnt phenomenon such that the TVS diode is damaged and has its lifespan reduced. Accordingly, abnormality of the snubber circuit unit 50 is incurred and thus the total power supply circuit cannot be protected from the transient voltage.

SUMMARY OF THE INVENTION

The present invention has been developed in order to solve the above problems in the related art. Accordingly, an object of the present invention is to provide a power supply circuit for a video display device capable of performing a stable operation by improving transient state characteristics of respective TVS diodes used in a snubber circuit unit.

The foregoing object is realized by providing a power supply circuit for a video display device comprising: a power transformer for inducing a voltage with respect to an input voltage by using an interaction occurring between a primary coil and a secondary coil; a switching circuit unit for controlling the voltage to be induced at the secondary coil of the power transformer by switching on/off a current flowing along the primary coil of the power transformer; first and second TVS diodes serially connected to each other, for absorbing a transient voltage in a reverse direction that is supplied through the primary coil of the power transformer; first and second resistances parallel connected to the respective first and second TVS diodes; a capacitor parallel connected to both ends of the first and second TVS diodes connected to each other and being charged with the transient voltage in the reverse direction that is supplied through the primary coil of the power transformer; and a diode for forming a passage of current in one direction when the capacitor is charged. It is preferred that the first and second resistances have the same resistance values.

Preferably, the power supply circuit further comprises a rectifier circuit unit for rectifying an input AC power and supplying the rectified power to the primary coil of the power transformer, and an output circuit unit for rectifying and smoothing the voltage induced at the secondary coil of the power transformer.

It is preferred that the switching circuit unit comprises: a field effect transistor for switching on/off the current flowing along the primary coil of the power transformer; and a controller for controlling an on/off switching operation of the field effect transistor.

Also, it is preferred that a bead-core is connected between the field effect transistor and the primary coil of the power transformer, for removing noise.

BRIEF DESCRIPTION OF THE DRAWINGS

The above object and a feature of the present invention will be more apparent by describing a preferred embodiment of the present invention with reference to the accompanying drawings, in which.

DETAILED DESCRIPTION OF THE PREFERRED EMBODIMENTS

Hereinafter, the present invention will be described in greater detail with reference to the accompanying drawings.

Figure 1:
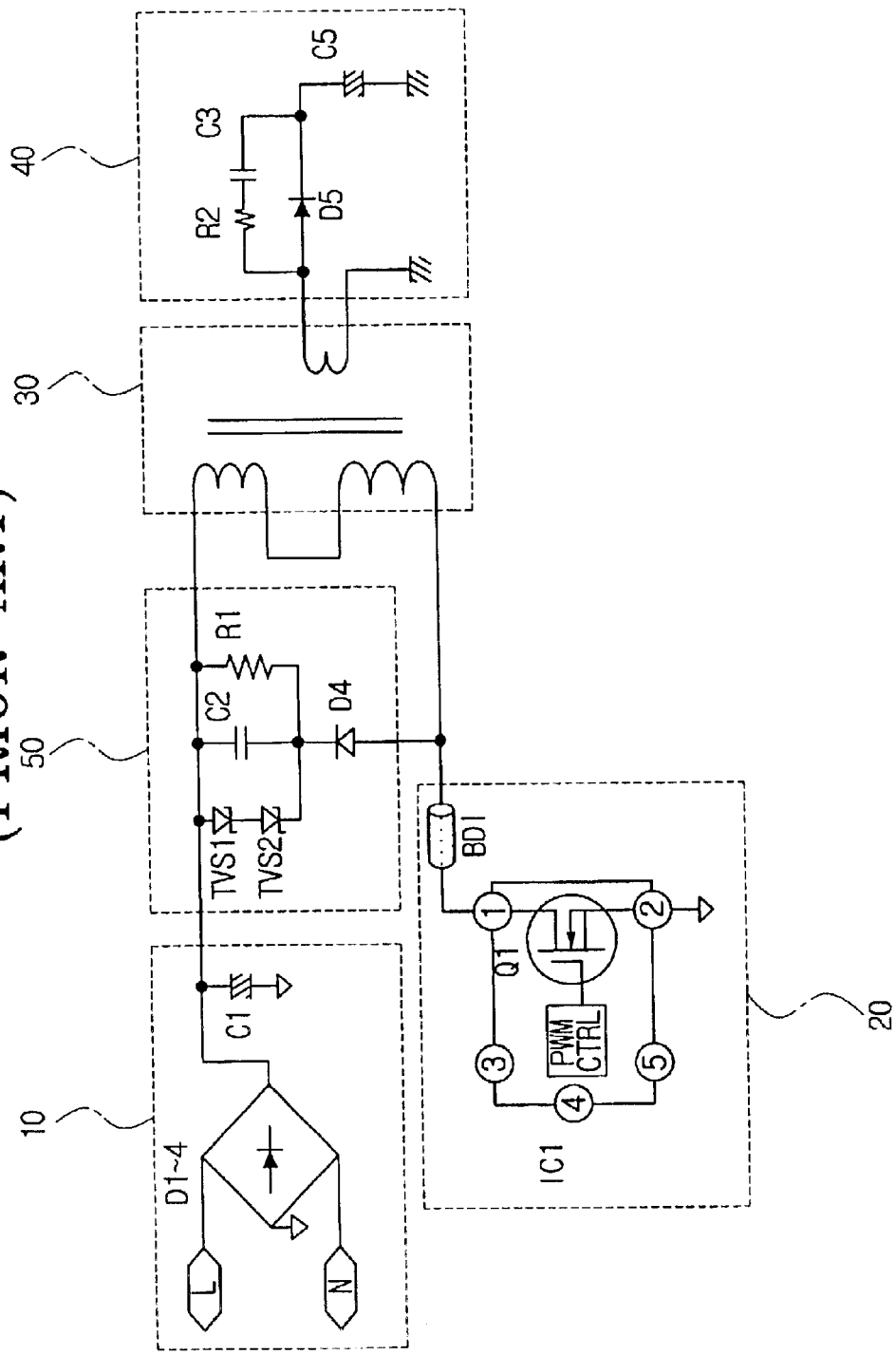
FIG. 1 is a view showing a power supply circuit for a conventional video display device.
Figure 2:
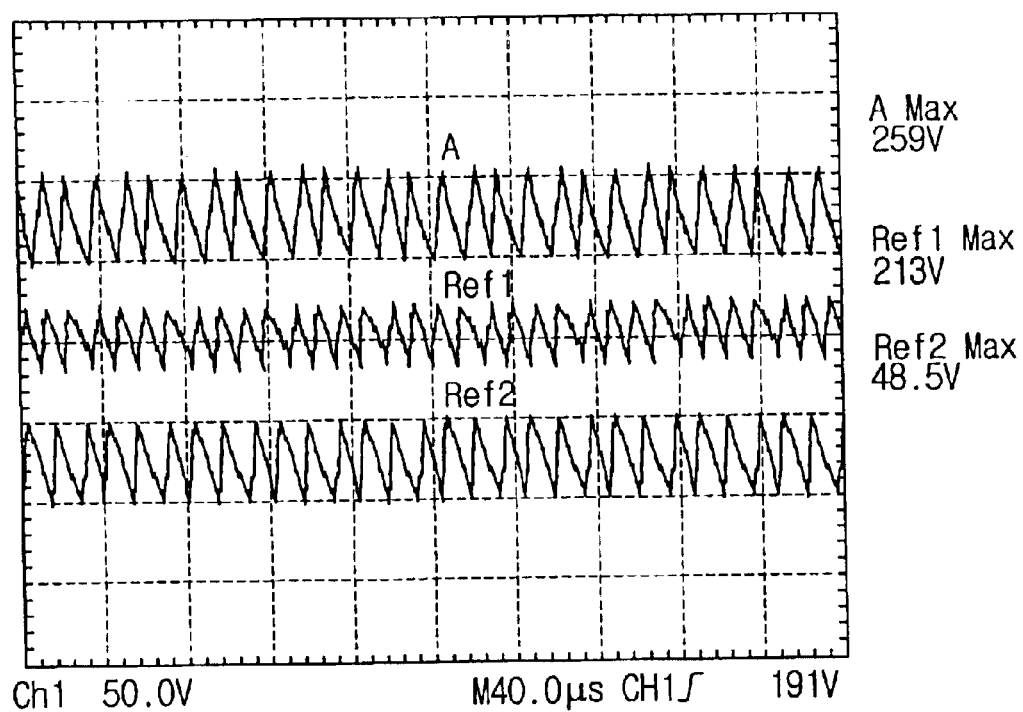
FIG. 2 is a view showing waveforms of voltages that are supplied to TVS diodes of the power supply circuit of FIG. 1.
Figure 3:
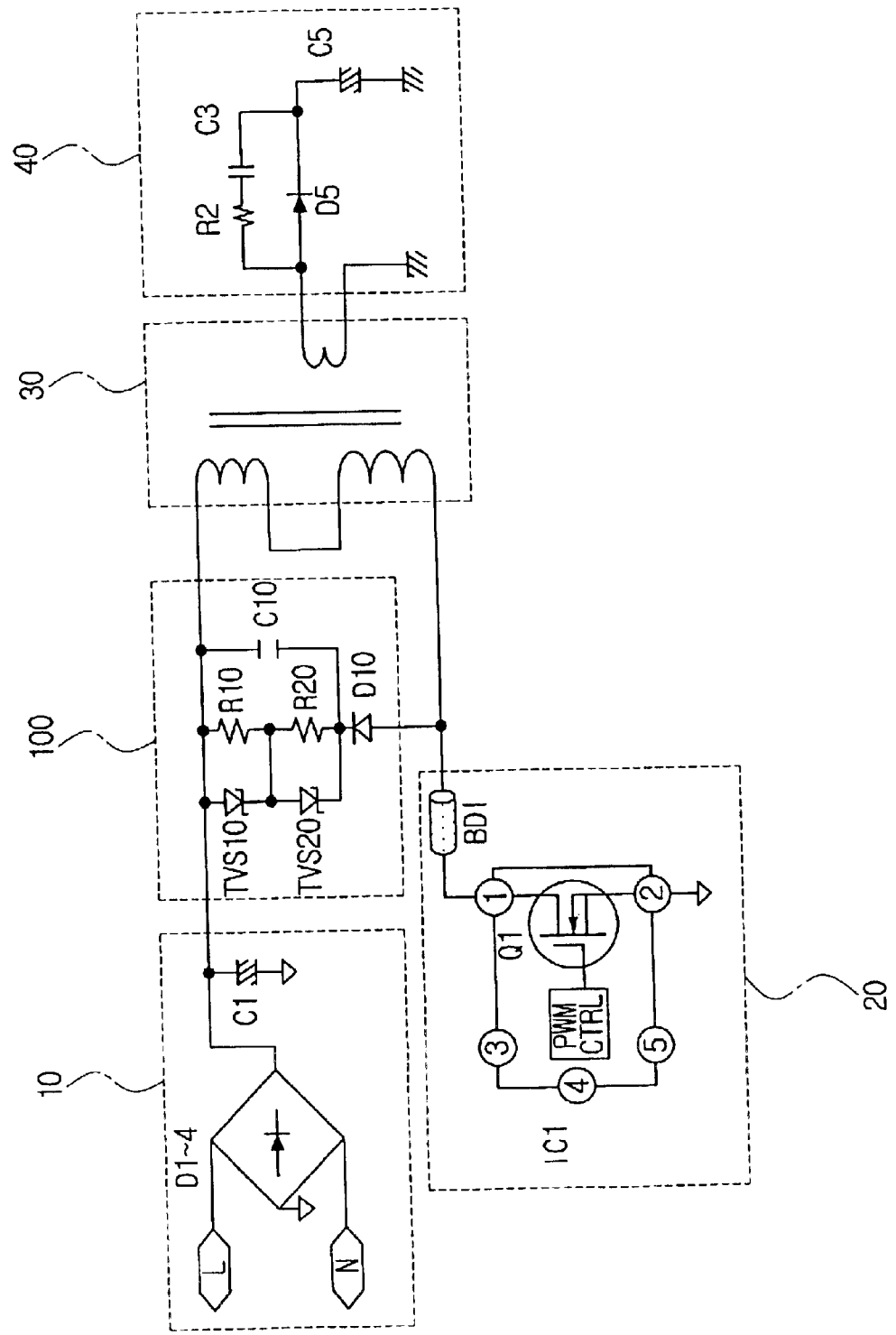
FIG. 3 is a view showing a power supply circuit for a video display device according to the present invention.

FIG. 3 shows a power supply circuit for a video display device according to the present invention. The power supply circuit is identical to that of the general video display device as shown in FIG. 1 except for a snubber circuit unit 100.

As shown in FIG. 3, the power supply circuit consists of a rectifier circuit unit 10, a switching circuit unit 20, a power transformer 30, an output circuit unit 40, and a snubber circuit unit 100.

The rectifier circuit unit 10 rectifies an AC power externally inputted by using diodes D1~4 for a rectification and a capacitor C1 for a charge. The voltage rectified by the rectifier circuit unit 10 is supplied to a primary coil of the power transformer 30. The power transformer 30 induces a voltage at the secondary coil by using an interaction occurring between the primary and secondary coils.

The switching circuit unit 20 consists of a switching control chip IC1 and a bead-core BD1. The switching control chip IC1 consists of a field effect transistor Q1 for switching and a controller (PWM CTRL) for controlling an on/off switching operation of the field effect transistor Q1. The controller (PWM CTRL) generates a switching pulse by which the field effect transistor Q1 repeats the on/off switching operation.

The switching circuit unit 20 is connected to an end of the primary coil of the power transformer 30 and switches on/off a current flowing along the primary coil of the power transformer 30 according to the on/off switching operation of the field effect transistor Q1. Accordingly, the switching circuit unit 20 controls the voltage to be induced at the secondary coil of the power transformer 30. The bead-core BD1 connected between the switching control chip IC1 and the power transformer 30 is for removing a noise from an output signal of the switching control chip IC1.

The voltage induced at the secondary coil of the power transformer 30 is transmitted to the output circuit unit 40. The output circuit unit 40 rectifies and smoothes the voltage induced at the secondary coil of the power transformer 30 and outputs a final DC voltage.

The snubber circuit unit 100 consists of a first TVS diode TVS 10 and a second TVS diode TVS20 which are serially connected to one end of the primary coil of the power transformer 30, a diode D10 forwardly connected between the other end of the primary coil of the power transformer 30 and the first and second TVS diodes TVS10 and TVS20 serially connected to each other, a first resistance R10 and second resistance R20 parallel connected to the respective first and second TVS diodes TVS10 and TVS20, and a capacitor C10 parallel connected to the first and second TVS diodes serially connected to each other.

When the switching circuit unit 20 performs the off switching operation, the snubber circuit unit 100 charges the capacitor C10 with a transient voltage supplied from the primary coil of the power transformer 30 in a reverse direction through the diode D10. Then, the snubber circuit unit 100 absorbs and removes the transient voltage in the reverse direction which can be rapidly changed within a short time, by discharging the transient voltage slowly at the first and second resistances R10 and R20. At this time, the first and second TVS diodes TVS10 and TVS20 function to clamp the transient voltage in the reverse direction. As described above, the snubber circuit unit 100 absorbs and removes the transient voltage in the reverse direction such that the field effect transistor Q1 of the switching circuit unit 20 is prevented from being supplied with voltage exceeding a rated voltage and being damaged.

Meanwhile, the first and second resistances R10 and R20 that are parallel connected to the respective first and second TVS diodes in the snubber circuit unit 100 have the same resistance values. Due to the first and second resistances R10 and R20 parallel connected to each other and having the same resistance values, the voltages to be supplied to the first and second diodes TVS10 and TVS20 are almost equal.

Figure 4:
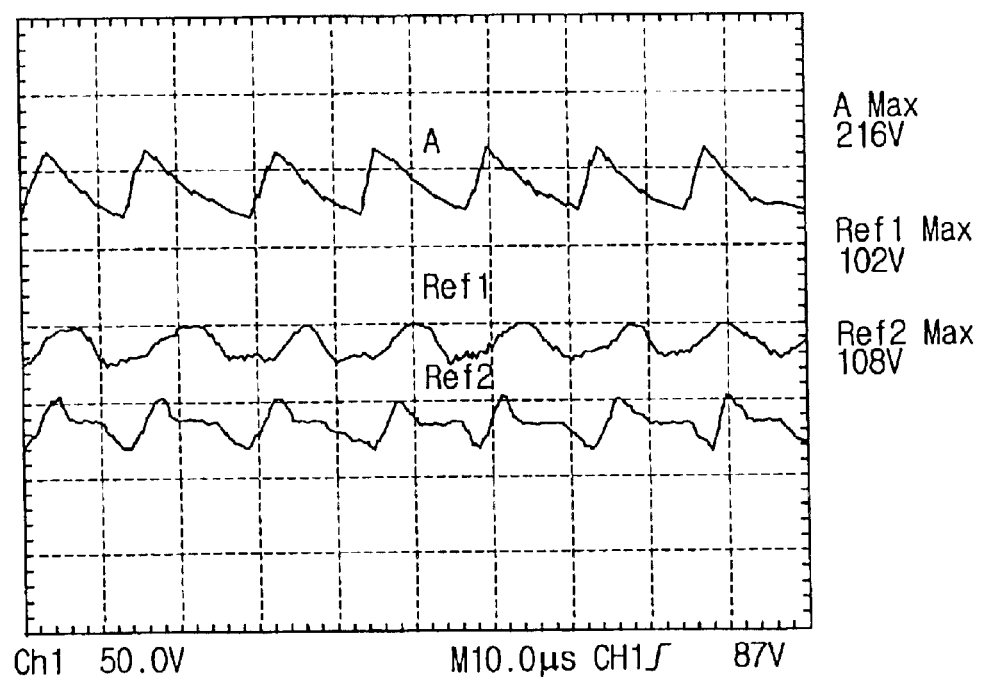
FIG. 4 is a view showing waveforms of voltages that are supplied to TVS diodes of the power supply circuit for the video display device according to the present invention.

FIG. 4 shows waveforms of voltages that are supplied to the TVS diodes TVS10 and TVS20.

As shown in FIG. 4, a waveform A represents a voltage that is supplied to both ends of the first and second TVS diodes TVS10 and TVS20 serially connected to each other, with the maximum value of 216V. A waveform Ref1 represents a voltage that is supplied to both ends of the second TVS diode TVS20, with the maximum value of 102V. A waveform Ref2 represents a voltage that is supplied to the first TVS diode TVS10, with the maximum value of 108V.

As shown in FIG. 4, the voltage is distributed almost equally to the first and second TVS diodes TVS10 and TVS20 due to the first and second resistances R10 and R20. Accordingly, since supplying a higher voltage to one of the two TVS diodes is prevented, the respective TVS diodes TVS10 and TVS20 are capable of a stable operation within a rated voltage level.

As described above, by supplying the voltage equally to the TVS diodes serially connected to each other in the snubber circuit unit, one of the TVS diodes is prevented from operating at a voltage exceeding the rated voltage. Accordingly, the TVS diodes are protected from a transient voltage in the reverse direction and thus are prevented from being damaged and/or destroyed. Therefore, stable operation of all the circuit units can be obtained.

The foregoing embodiments and advantages are merely exemplary and are not to be construed as limiting the present invention. The present teaching can be readily applied to other types of apparatuses. The description of the present invention is intended to be illustrative, and is not intended to limit the scope of the claims. Many alternatives, modifications, and variations will be apparent to those skilled in the art. In the claims, means-plus-function clauses are intended to cover the structures described herein as performing the recited functions.

What is claimed is:

1. A power supply circuit for a video display device comprising:

a power transformer for inducing a voltage with respect to an input voltage by using an interaction occurring between a primary coil and a secondary coil;

a switching circuit unit for controlling the voltage to be induced at the secondary coil of the power transformer by switching on/off a current flowing along the primary coil of the power transformer;

first and second TVS diodes serially connected to each other, for absorbing a transient voltage in a reverse directional to that in which the current flows through the primary coil of the power transformer;

first and second resistors parallel connected to the respective first and second TVS diodes;

a capacitor parallel connected to both ends of the first and second TVS diodes connected to each other and being charged with the transient voltage in the reverse directional to that in which the current flows through the primary coil of the power transformer; and a diode for forming a passage of current in one directional when the capacitor is charged.

2. The power supply circuit of claim 1, wherein the first and second resistors have the same resistance values.

3. The power supply circuit of claim 1, further comprising a rectifier circuit unit for rectifying an input AC power and supplying the rectified power to the primary coil of the power transformer.

4. The power supply circuit of claim 1, further comprising an output circuit unit for rectifying and smoothing the voltage induced at the secondary coil of the power transformer.

5. The power supply circuit of claim 1, wherein the switching circuit unit comprises:

a field effect transistor for switching on/off the current flowing along the primary coil of the power transformer; and a controller for controlling an on/off switching operation of the field effect transistor.

6. The power supply circuit of claim 5, wherein a bead-core is connected between the field effect transistor and the primary coil of the power transformer.

7. The power supply circuit of claim 6, wherein the bead-core is adapted to remove a noise.

* * * * *